United States Patent Office 3,374,293
Patented Mar. 19, 1968

3,374,293
PHOSPHORIC, PHOSPHONIC, PHOSPHINIC, THIO-NOPHOSPHORIC, -PHOSPHONIC, -PHOSPHINIC ACID ESTERS
Rudolf Heiss and Karl Mannes, Cologne-Stammheim, Heinrich Pelster, Leverkusen, Günter Unterstenhöfer, Opladen, and Wolfgang Behrenz, Wuppertal-Elberfeld, Germany, assignors to Farbenfabriken Bayer Aktiengesellschaft, Leverkusen, Germany, a corporation of Germany
No Drawing. Continuation-in-part of application Ser. No. 331,121, Dec. 17, 1963. This application Jan. 5, 1965, Ser. No. 423,576
Claims priority, application Germany, Dec. 22, 1962, F 38,633
13 Claims. (Cl. 260—949)

This application is a continuation-in-part of application Ser. No. 331,121 filed Dec. 17, 1963, now abandoned, in the names of the instant inventors.

The present invention relates to and has as its objects new and useful pesticidally, especially insecticidally active phosphorus containing compounds.

More specifically this invention has as its objects phosphoric, phosphonic, phosphinic, thionophosphoric, -phosphonic, -phosphinic acid esters of the general formula

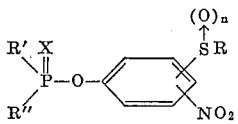

as well as a process for the production of those compounds. In the above formula, R represents a straight-chain or branched optionally substituted alkyl or an optionally substituted cycloalkyl or aryl radical, whilst R' and R" denote optionally substituted alkyl, alkenyl, cycloalkyl, aralkyl, or aryl radicals, which may be linked directly to the phosphorus atom or via oxygen, sulphur, or nitrogen. R' and R" may in addition represent optionally N-substituted amino groups, X denotes an oxygen or sulphur atom and the index $n$ has a value of zero, 1, or 2.

The symbol R preferably represents a methyl, methoxycarbonylmethyl, ethyl, hydroxyethyl, propyl, isopropyl, n-butyl, cyclohexyl, isooctyl, or n-dodecyl group, and also a phenyl, chlorophenyl, methylphenyl, methoxyphenyl, or nitrophenyl radical, whilst R' and R" preferably denote methyl, ethyl, chloromethyl, isopropyl, isobutyl, isooctyl, methoxyphenyl, ethylthiophenyl, benzyl, phenyl, chlorophenyl, and methoxyphenyl radicals, and also methoxy, ethoxy, isopropoxy, chloroethoxy, methylmercapto, ethylmercapto, isopropylmercapto, chloroethylmercapto radicals as well as mono- or di-methyl-(-ethyl-, -cyclohexyl)-amino groups.

It has been found that compounds of the above stated structure are obtained smoothly and in good yields when (thiono-)- phosphoric-(phosphonic, phosphinic) acid ester monohalides of the general formula

are reacted with mono-alkyl-, -cycloalkyl- or -aryl-mercapto-(-sulphoxido-, -sulphono-)-mono-nitrophenols of the formula

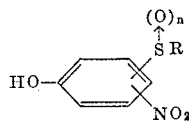

In the last-mentioned formulae, the symbols R, R', R", X and $n$ have the above stated significance, whereas Hal denotes a halogen atom.

The following phenols may be mentioned as examples of those suitable for the reaction according to the invention:

3-methylmercapto-4-, 3-ethylmercapto-4-, 5-isopropylmercapto-2-, 5-butylmercapto-2-, 5-isooctylmercapto-2-, 3-dodecylmercapto-4-, 3-phenylmercapto-4-, 3-methoxyphenylmercapto-4-, 5-chlorophenylmercapto-2-, 3-p-tolylmercapto-4-, and 5-nitrophenylmercapto-2-nitrophenol, as well as 3-methylsulphoxyl-4- and 3-ethylsulphonyl-4-nitrophenol.

The process according to the invention is preferably carried out in the presence of inert organic solvents, among these, optionally chlorinated aliphatic or aromatic hydrocarbons, alcohols, as well as low boiling aliphatic ketones, such as acetone, methyl ethyl ketone, methyl isopropyl ketone, or methyl isobutyl ketone and nitriles, such as acetonitrile and propio-nitrile, as well as dimethylformamide have, inter alia, proved suitable.

In addition, the preparation of the (thiono-)phosphoric (-phosphonic, -phosphinic) acid esters according to the invention is preferably carried out in the presence of acid binding agents, among which alkali metal alkoxides and carbonates as well as tertiary amines are particularly suitable. However, it is just as possible to prepare the salts, preferably the alkali metal salts, of the above mentioned phenols and subsequently to react these with the above mentioned (thiono-)-phosphoric (-phosphonic, -phosphinic) acid ester halides in accordance with the process of the invention.

The reaction according to the process already takes place at room temperature, but it has proved convenient to carry out the reaction at slightly to moderately elevated temperatures and also to continue heating the reaction mixture for some time, with stirring, after the starting components have been combined. In that case, the products of the process are obtained in particularly good yields and also with excellent purity.

The monoalkyl-, -cycloalkyl- or -aryl-mercapto-mono-nitro-phenols required as starting materials for the reaction according to the invention and not hitherto known from the literature can be prepared by reacting the corresponding monochloro-mono-nitro-phenols with a mercapto compound of the general formula R—SH, wherein R has the same significance as given above, said reacting being effected in a liquid medium in the presence of an inorganic base in the reaction mixture at a temperature of 0 to 120° C. and isolating the monomercapto-mono-nitrophenols from the liquid medium.

Some of the (thiono-)phosphoric (-phosphonic, phosphinic) acid esters according to the invention constitute well crystallised substances with a sharp melting point, which can readily be further purified by recrystallisation from the usual solvents; however, some of the products are also obtained in the form of viscous oils which can not be distilled without decomposition even at strongly reduced pressures.

The products are characterised by a very good pesticidal activity, particularly by an excellent insecticidal action, and are therefore employed as pest control agents, especially in plant protection.

The new compounds of the present invention very effectively kill insects like aphids, spider mites, caterpillars, flies, ticks, etc. They distinguish themselves especially by a good contact-insecticidal activity and mostly also by a systemic action. At the same time they have an activity on eating insects such as caterpillars. Most surprisingly they are of remarkably low toxicity against warm blooded-animals.

The application of the compounds according to the invention for the above stated purpose is carried out by the method usual for insecticides based on phosphoric acid esters, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As examples for the special utility the inventive compounds of the following formulae (I) 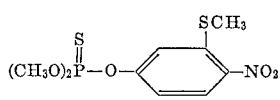

(II) 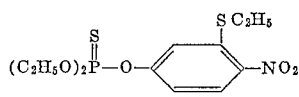

(III) 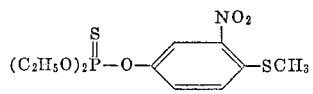

have been tested against aphids (compounds II and III), spider mites (compound III), caterpillars (compounds II and III) and mosquito larvae (compounds I and II). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| II | 0.01 | 90 |
| III | 0.001 | 98 |

(b) Against spider mites: bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

Compound _____ III
Aqueous concentration (in percent active ingredient/water) _____ 0.001
Killing rate (in percent) _____ 98

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| II | 0.01 | 100 |
| III | 0.001 | 100 |

(d) Against mosquito larvae of the type *Aedes aegypti*: about 20 larvae were brought into diluted aqueous emulsions prepared as described above. Counting of the dead pests occurred after 24 hours.

The following results have been obtained:

| Compound | Aqueous concentration (in percent active ingredient/water) | Killing rate (in percent) |
|---|---|---|
| I | 0.000001 | 100 |
| II | 0.0000001 | 60 |

The following examples illustrate the invention:

*Example 1*

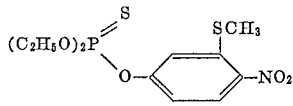

18.5 g. (0.1 mole) of 3-methylmercapto-4-nitrophenol (M.P. 175 to 176° C.) are stirred together with 15.2 g. of anhydrous potassium carbonate at 60° C. for one hour in 100 ml. of dry methyl ethyl ketone. 18.8 g. of O,O-diethylthionophosphoric acid ester chloride are subsequently added dropwise to the reaction mixture and the latter is heated at 60 to 70° C. for another hour. After the mixture has been cooled to room temperature, the separated salts are filtered off with suction and washed with methyl ethyl ketone. The filtrate is combined with the wash liquor and poured into 1 litre of ice-water, whereupon the separated oil solidifies in the form of crystals within a short time. The crystals are filtered off with suction, washed with water, and dried. The O,O-diethyl-thionophosphoric acid-O-(3-methyl-mercapto - 4 - nitrophenyl-) ester (30 g., corresponding to 91% of the theoretical yield) obtained by this method is recrystallised from methyl-cyclohexane and then has a melting point of 61 to 62° C. The yield of pure product amounts to 28.6 g., corresponding to 85% of the theoretical.

*Analysis.*—Calcd.: P, 9.2%; S, 19.0%; N, 4.15%. Found: P, 9.2%; S, 18.9%; N, 4.45%.

90% destruction of aphids and 100% destruction of leaf beetles is caused by 0.001% solution of the compound. Moreover, 0.1% solution of the product have a 100% systemic activity towards aphids.

*Example 2*

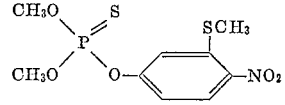

18.5 g. (0.1 mole) of 3-methylmercapto-4-nitrophenol, 15.2 g. of potassium carbonate, and 17.6 g. (0.11 mole) of O,O-dimethyl-thionophosphoric acid ester chloride are reacted in methyl ethyl ketone in the same manner as described in Example 1. The oil which separates when the reaction mixture is poured into water is taken up in benzene, the benzene solution is washed with water until its reaction is neutral, and it is dried over sodium sulphate. When the solvent has been evaporated off in vacuo, 28.3 g. (91.5% of the theoretical yield) of O,O-dimethyl-thionophosphoric acid-O-(3-methylmercapto-4-nitrophenyl-) ester remain in the form of a brown oil.

*Analysis.*—Calcd.: P, 10.1%; S, 20.7%; N, 4.53%. Found: P, 10.4%; S, 20.85%; N, 4.73%.

The mean toxicity of the compound on rats per os amounts to 250 mg. per kg. of animal. Mosquito larvae are killed 100% by 0.000001% solution of the ester.

The 3-methylmercapto-4 nitrophenol to be used as starting material is prepared in accordance with the general statements given above in the following way:

173.6 g. (1 mole) of 3-chloro-4-nitrophenol are dissolved in 300 ml. of ethanol, and a solution of 80 g. of sodium hydroxide in 550 ml. of water is added to the mixture with cooling and stirring. 24.6 litres (1.1 mole) of gaseous methyl-mercaptan is then introduced into the reaction mixture at 5° to 10° C., with cooling, and the reaction mixture is boiled under reflux for 3½ hours at an internal temperature of 80° C., a dark red solution being formed. The solution is cooled to 60° C. and acidified to pH 2 to 3 by adding about 210 ml. of 20% hydrochloric acid dropwise. This precipitates 3-methyl-mercapto-4-nitro-phenol in the form of orange crystals. Precipitation is completed by slowly cooling the mixture to +10° C. 3-methyl-mercapto-4-nitrophenol is filtered off by suction, washed with water and dried in vacuo. Yield: 170 g. of 3-methylmercapto-4-nitrophenol M.P. 174.5° to 175.5° C. (this corresponds to 92% of the theoretical yield). The compound crystallises from an ethyl acetate/benzene mixture (1:2) in orange needles of M.P. 175 to 176° C.

*Analysis.*—$C_7H_7NO_3S$ (molecular weight 185.2). Calculated: C, 45.41%; H, 3.81%; N, 7.57%; O, 25.92%; S, 17.28%. Found: C, 45.41%; H, 3.76%; N, 7.73%; O, 25.54%; S, 17.4%, molecular weight 190.

The following compounds can be obtained under the same reaction conditions:

| Constitution | Yield (percent of the theoretical) | Physical properties |
| --- | --- | --- |
| $(CH_3O)_2P(=S)(O-C_6H_3(SC_2H_5)-NO_2)$ | 74.5 | Brown oil. |

The mean toxicity of the compound amounts to about 300 mg. per kg. of animal, per orally on the rat. 100% destruction of mosquito larvae is caused by 0.000001% solutions of the product.

| Constitution | Yield (percent of the theoretical) | Physical properties |
| --- | --- | --- |
| $(C_2H_5O)_2P(=O)(O-C_6H_3(SC_2H_5)-NO_2)$ | 80.5 | Brown oil. |
| $(i-C_3H_7O)_2P(=S)(O-C_6H_3(SCH_3)-NO_2)$ | 87.7 | Light brown oil. |
| $CH_3-P(=S)(OC_2H_5)(O-C_6H_3(SCH_3)-NO_2)$ | 86 | Brown oil. |
| $CH_3-P(=S)(OC_2H_5)(O-C_6H_3(SC_2H_5)-NO_2)$ | 85.5 | Brown oil. |
| $(C_2H_5O)_2P(=S)(O-C_6H_3(SC_4H_9)-NO_2)$ | 83.2 | Yellow-brown oil. |
| $(CH_3O)_2P(=S)(O-C_6H_3(SC_4H_9)-NO_2)$ | 77.5 | Yellow-brown oil. |
| $(C_2H_5O)_2P(=S)(O-C_6H_3(SC_{12}H_{25})-NO_2)$ | 80 | Light brown oil. |
| $(CH_3O)_2P(=S)(O-C_6H_3(SC_{12}H_{25})-NO_2)$ | 63 | Light brown oil. |
| $(Cl-CH_2-CH_2O)_2P(=O)(O-C_6H_3(SCH_3)-NO_2)$ | 84 | Brown oil. |
| $C_6H_5-P(=S)(OC_2H_5)(O-C_6H_3(SC_2H_5)-NO_2)$ | 95 | Light brown oil. |
| $(CH_3O)(C_2H_5)_2N-P(=O)(O-C_6H_3(SCH_3)-NO_2)$ | 18 | Calc.: P, 9.3%; N, 8.4%. Found: P, 9.6%; N, 8.0%. |

| Constitution | Yield (percent of the theoretical) | Physical properties |
|---|---|---|
| (CH₃O)₂P(=S)-O-C₆H₃(NO₂)-S-C₆H₅ | 67.3 | Calc.: P, 8.3%; N, 3.8%. Found: P, 8.0%; N, 4.0%. |
| (C₂H₅O)₂P(=S)-O-C₆H₃(NO₂)-S-C₆H₅ | 90.3 | Calc.: P, 7.8%; S, 16.0%. Found: P, 8.2%; S, 15.9%. |
| (C₂H₅O)₂P(=O)-O-C₆H₃(NO₂)-S-C₆H₅ | 91.5 | M.P.: 56 to 58° C. Calc.: P, 8.1%; N, 3.7%. Found: P, 8.3%; N, 3.6%. |
| (C₂H₅O)₂P(=S)-O-C₆H₃(NO₂)-S-C₆H₄-CH₃ | 69.4 | M.P.: 69 to 71° C. Calc.: P, 7.5%; N, 3.4%. Found: P, 7.4%; N, 3.5%. |
| (C₂H₅O)₂P(=S)-O-C₆H₃(NO₂)-S-C₆H₄(CH₃) (ortho-CH₃) | 92 | M.P.: 65 to 66° C. Calc.: P, 7.5%; N, 3.4%. Found: P, 7.65%; N, 3.6%. |
| (C₂H₅O)₂P(=S)-O-C₆H₃(NO₂)(CH₃)-S-C₆H₅ | 81 | Calc.: P, 7.5%; N, 3.4%. Found: P, 7.7%; N, 3.5%. |
| (C₂H₅O)₂P(=S)-O-C₆H₃(NO₂)-S-C₆H₄-Cl | 95 | M.P.: 63 to 65° C. Calc.: P, 7.2%; Cl, 8.2%. Found: P, 7.4%; Cl, 8.3%. |
| (C₂H₅O)₂P(=S)-O-C₆H₃(NO₂)(Cl)-S-C₆H₅ | 92.5 | Calc.: P, 7.2%; S, 14.9%. Found: P, 7.3%; S, 15.0%. |
| (C₂H₅O)₂P(=S)-O-C₆H₃(NO₂)-S-C₆H₄(Cl) (ortho-Cl) | 96 | Calc.: P, 7.6%; S, 15.8%; C, 18.75%. Found: P, 7.55%; S, 15.9%; C, 18.75%. |
| (C₂H₅O)₂P(=S)-O-C₆H₃(NO₂)-SCH₂COOCH₃ | 82 | Calc.: P, 7.85%; N, 3.55%. Found: P, 8.15%; N, 3.7%. |

Example 3

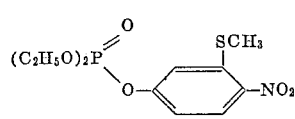

18.5 g. (0.1 mole) of 3-methylmercapto - 4 - nitrophenol, 15.2 g. of potassium carbonate, and 18.6 g. of O,O-diethylphosphoric acid ester chloride are reacted in methyl ethyl ketone in the same way as described in Example 1. The oil obtained when the mixture is worked up (26 g., corresponding to 81% of the theoretical yield) solidifies in the form of crystals after standing for some time. The O,O - diethylphosphoric acid-O-(3 - methylmercapto - 4 - nitrophenyl-)ester has a melting point of 35 to 37° C.

The following compound is obtained by the same method:

| Constitution | Yield (percent of the theoretical) | Physical properties |
|---|---|---|
| (C₂H₅O)₂P(=S)-O-C₆H₃(NO₂)-SC₂H₅ | 77 | M.P.: 42–44°. |

The means toxicity of the compound on rats per os amounts to 50 mg. per kg. of animal. Caterpillars are 100% destroyed and aphids are 90% destroyed by 0.01% solution, and mosquito larvae are still 60% killed by 0.0000001% solution of the ester.

Example 4

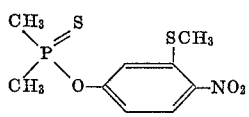

14 g. of dimethyl-thionophosphinic acid ester chloride are added dropwise at 40 to 50° C. to a mixture of 18.5 g. (0.1 mole) of 3 - methylmercapto - 4 - nitrophenol, 15.2 g. of potassium carbonate, and 100 ml. of acetonitrile. The mixture is subsequently stirred at 50 to 60° C. for another 2 hours. After it has been cooled to room temperature, the mixture is poured into 1 litre of ice-water, the separated crystalline product is filtered off with suction, washed with water, dried, and recrystallised from n-propanol. The dimethyl-thionophosphinic acid - O - (3-methylmercapto - 4 - nitrophenyl-)ester now melts at 78° C. The yield amounts to 67.5% of the theoretical.

Example 5

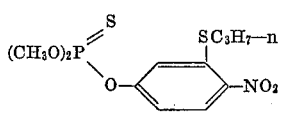

14.2 g. (0.066 mole) of 3-n-propylmercapto - 4 - nitrophenol (M.P. 117 to 118° C.) are reacted with 11.1 g. of potassium carbonate and 15.3 g. of O,O - dimethyl-thionophosphoric acid ester chloride (in the form of a 76.8% solution) in anhydrous methyl ethyl ketone by the method described in Example 1. 19 g. of O,O-dimethyl-thionophosphoric acid - O - (3-n-propylmercapto-4-nitrophenyl-)ester, corresponding to 84.5% of the theoretical yield, are obtained in the form of a brown oil.

The following compounds can be prepared by the same method.

| Constitution | Yield (% of the theoretical) | Physical properties |
|---|---|---|
| (C₂H₅O)₂P(=S)-O-C₆H₃(SC₃H₇-n)(NO₂) | 94.5 | Brown oil. |
| (C₂H₅O)₂P(=S)-O-C₆H₃(SC₃H₇-i)(NO₂) | 93 | Brown oil. |
| (CH₃O)₂P(=S)-O-C₆H₃(SC₃H₇-i)(NO₂) | 87.7 | M.P.: 48–50° C. |

Example 6

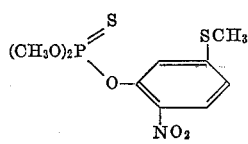

9.2 g. (0.05 mole) of 2-nitro-5-methylmercapto-phenol (M.P. 179 to 180° C.) are reacted in the presence of potassium carbonate with 11.5 g. (0.055 mole) of O,O-dimethyl-thionophosphoric acid ester chloride in 50 ml. of anhydrous acetone in the same way as described in Example 1. The reaction product which is obtained in the form of crystals is filtered off with suction, washed with water, and dried over sodium sulphate. The yield of O,O - dimethyl - thionophosphoric acid-O-(2-nitro-5-methylmercapto-phenyl-)ester amounts to 92% of the theoretical. When recrystallised from methylcyclohexane, the compound melts at 62° C.

The 2-nitro-5-methylmercaptophenol necessary as starting material is produced by the following method:

173.6 g. (1 mole) of 2-nitro-5-chlorophenol are suspended in 500 ml. of water and a solution of 80 g. (2 mole) of sodium hydroxide in 600 ml. water is added with stirring. 24.6 litres (1.1 mole) of gaseous methyl mercaptan are introduced into this mixture and the latter is then heated for 4 hours under mild reflux. After acidifying the reaction mixture with 20% hydrochloric acid to pH 2 to 3, the mixture is cooled to 10° C. and 2-nitro-5-methylmercaptophenol which has precipitated in the form of dark crystals is removed by suction filtration. A small quantity of product may still be removed in the form of oil from the filtrate and crystallised from benzene/ligroin. The yield amounts to 146 g. 2-nitro-5-methylmercapto-phenol (79% of the theoretical).

The compound crystallises from benzene/ligroin-mixture in the form of yellow brown needles of M.P. 75° C. to 76° C.

*Analysis.*—C₇H₇NO₃S (molecular weight 185.2). Calculated: C, 45.41%; H, 3.81%; N, 7.57%; O, 25.92%; S, 17.28%; molecular weight 185.2. Found: C, 45.46%; H, 3.94%; N, 7.71%; O, 25.99%; S, 17.29%; molecular weight 188.

Example 7

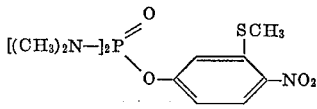

18.5 g. of 3-methylmercapto-4-nitrophenol and 15.2 g. of powdered potassium carbonate in 100 ml. of methyl ethyl ketone are reacted with 17.9 g. of bis-(N,N-dimethylamido)-phosphoric acid chloride as described in Example 2. When the reaction mixture has been worked up, 21 g. of bis-(N,N-dimethylamido-)phosphoric acid-O-(3-methylmercapto-4-nitrophenyl-)ester, corresponding to 66% of the theoretical yield, are obtained in the form of a brown oil.

Example 8

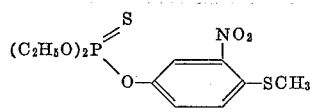

18.5 g. (0.1 mole) of 3-nitro-4-methylmercaptophenol (M.P. 115 to 116° C.) and 21.1 g. (0.105 mole) of O,O-diethyl-thionophosphoric acid ester chloride are reacted in the presence of 15.2 g. (0.11 mole) of anhydrous potassium carbonate in the same manner as described in Example 1. After working up the reaction mixture there are obtained 31 g. corresponding to 92% of the theoretical yield of O,O-diethylthionophosphoric acid-O-(3-nitro-4-methylmercapto-phenyl-)ester in the form of a light brown oil.

*Analysis.*—Calc.: P, 9.2%; S, 19.0%; N, 4.15%; Found: P, 9.1%; S, 19.1%; N, 3.9%.

Caterpillars are completely destroyed by 0.001% solutions of the compound, aphids and spider mites are still killed 98%. Upon administration against spider mites the product is also ovicidally active.

In an analogous manner there can be prepared the following compounds:

| Constitution | Yield (percent of the theoretical) | Physical properties |
|---|---|---|
| (CH₃O)₂P(=S)O—C₆H₃(NO₂)—SCH₃ | 94 | M.P.: 80 to 82° C. |
| (i-C₃H₇O)₂P(=S)O—C₆H₃(NO₂)—SCH₃ | 96 | M.P.: 51 to 53° C. |
| (C₂H₅O)₂P(=O)O—C₆H₃(NO₂)—SCH₃ | 90.3 | Oil: Calc.: P, 9.65%; S, 9.95%. Found: P, 9.65%; S, 9.90%. |
| (C₂H₅O)₂P(=S)O—C₆H₃(NO₂)—SC₂H₅ | 91 | Oil: Calc.: S, 18.25%; N, 4.0%. Found: S, 18.20%; N, 4.15%. |
| (CH₃O)₂P(=S)O—C₆H₃(NO₂)—SC₂H₅ | 48.2 | M.P.: 57 to 59° C. |
| CH₃—P(=S)(OC₂H₅)O—C₆H₃(NO₂)—SCH₃ | 88 | Oil: Calc.: P, 10.1%; N, 4.55%. Found: P, 10.3%; N, 4.70%. |
| [(CH₃)₂N—]₂P(=O)O—C₆H₃(NO₂)—SCH₃ | 81.5 | M.P.: 48 to 50° C. |
| (C₂H₅O)₂P(=S)O—C₆H₃(NO₂)—S—C₆H₅ | 95.2 | Oil: Calc.: S, 16.05%; N, 3.51%. Found: S, 15.95%; N, 3.53%. |
| (CH₃O)₂P(=S)O—C₆H₃(NO₂)—S—C₆H₅ | 88 | Oil: Calc.: P, 8.35%; N, 3.77%. Found: P, 8.5%; N, 3.75%. |
| (C₂H₅O)₂P(=O)O—C₆H₃(NO₂)—SC₂H₅ | 91 | Calc.: P, 9.25%; S, 9.55%. Found: P, 9.2%; S, 9.55%. |
| (C₂H₅O)₂P(=S)O—C₆H₃(NO₂)—SC₃H₇-i | 87.7 | M.P.: 42 to 44° C. Calc.: P, 8.5%. Found: P, 8.5%. |
| (CH₃O)₂P(=S)O—C₆H₃(NO₂)—SC₃H₇-i | 92 | Calc.: P, 9.2%; S, 18.95%. Found: P, 9.3%; S, 18.8%. |
| (C₂H₅O)₂P(=O)O—C₆H₃(NO₂)—SC₃H₇-i | 86 | Calc.: P, 8.9%; S, 9.2%. Found: P, 8.7%; S, 9.0%. |
| (C₂H₅)₂N—P(=S)(CH₃)O—C₆H₃(NO₂)—SCH₃ | 84 | Calc.: P 9.3%; N, 8.5%. Found: P, 9.15%; N, 8.3%. |
| (CH₃)₂N—P(=S)(CH₃)O—C₆H₃(NO₂)—SCH₃ | 83 | Calc.: P, 10.15%; N, 9.15%. Found: P, 10.2%; N, 9.15%. |

| Constitution | Yield (percent of the theoretical) | Physical properties |
|---|---|---|
| 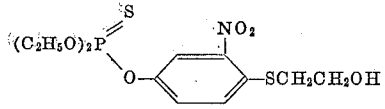 | 72.2 | Calc.: N, 3.8%; S, 17.5%. Found: N, 3.9%; S, 17.9%. |

Example 9

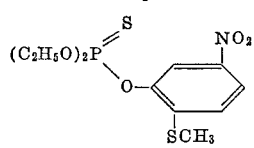

9.25 g. (0.05 mole) of 2-methylmercapto-5-nitrophenol (M.P. 146 to 147° C.) and 11 g. of O,O-diethyl-thionophosphoric acid ester chloride are reacted in the presence of 8.3 g. of potassium carbonate as described in Example 1 and there are obtained after working up the reaction mixture 16 g. of O,O-diethyl-thionophosphoric acid-O-(2-methylmercapto-5-nitrophenyl-)ester of melting point 60 to 62° C.

Example 10

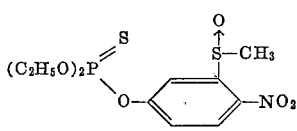

20.1 g. (0.1 mole) of 3-methylsulphoxido-4-nitrophenol (prepared in usual manner by oxydation of 3-methylmercapto-4-nitrophenol with hydrogen peroxide) are reacted with 21.1 g. (0.105 mole) of O,O-diethyl-thionophosphoric acid ester chloride in the presence of 15.2 g. (0.11 mole) of potassium carbonate in the same manner as described in Example 1. There are obtained 30 g., corresponding to 87.5 g. of the theoretical yield, of O,O-diethyl-thionophosphoric acid-O-(3-methyl-sulphoxido-4-nitrophenyl-)ester in a crystalline form. M.P. 49 to 51° C.

*Analysis.*—Calc.: P, 8.8%; S, 18.2%; N, 4.0%. Found: P, 9.0%; S, 18.3%; N, 4.15%.

What we claim is:
1. A compound of the formula

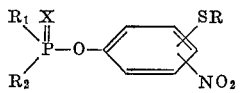

wherein $R_1$ and $R_2$ stand independently for members selected from the group consisting of alkyl having up to 8 carbon atoms, phenyl, lower alkoxy having up to 4 carbon atoms and monochloro lower alkoxy having up to 4 carbon atoms, R stands for a member selected from the group consisting of alkyl having up to 12 carbon atoms, lower alkoxy-carbonyl substituted lower alkyl, said lower alkoxy and lower alkyl having up to 4 carbon atoms and hydroxy substituted lower alkyl having up to 4 carbon atoms, and X stands for oxygen or sulfur.

2. The compound according to claim 1 wherein $R_1$ and $R_2$ stand for lower alkoxy having up to 4 carbon atoms and R stands for alkyl having up to 12 carbon atoms.

3. The compound according to claim 1 wherein $R_1$ stands for alkyl having up to 8 carbon atoms, $R_2$ stands for lower alkoxy having up to 4 carbon atoms and R stands for alkyl having up to 12 carbon atoms.

4. A compound of the formula

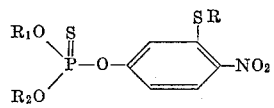

wherein $R_1$ and $R_2$ stand for lower alkyl having up to 4 carbon atoms and R stands for alkyl having up to 12 carbon atoms.

5. A compound of the formula

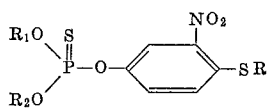

wherein $R_1$ and $R_2$ stand for lower alkyl having up to 4 carbon atoms and R stands for alkyl having up to 12 carbon atoms.

6. The compound of the formula

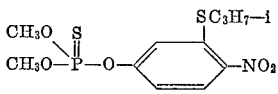

7. The compound of the formula

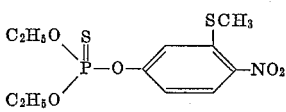

8. The compound of the formula

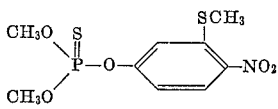

9. The compound of the formula

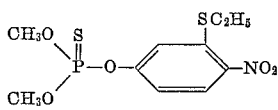

10. The compound of the formula

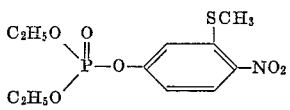

11. The compound of the formula

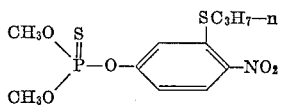

12. The compound of the formula

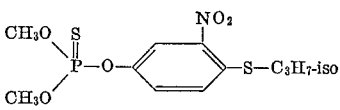

13. The compound of the formula

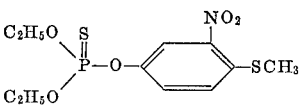

(References on following page)

References Cited

UNITED STATES PATENTS

| | | | |
|---|---|---|---|
| 2,754,242 | 7/1956 | Kosolapoff | 167—30 |
| 2,769,743 | 11/1956 | Mattson | 167—30 |
| 3,017,422 | 1/1962 | Thompson | 260—461 |
| 3,079,417 | 2/1963 | Farrar | 260—461 |
| 3,042,703 | 7/1962 | Schegk et al. | 260—949 |
| 3,153,663 | 10/1964 | Sirrenberg et al. | 260—949 X |

FOREIGN PATENTS

| | | |
|---|---|---|
| 216,205 | 9/1956 | Australia. |
| 560,179 | 9/1957 | Belgium. |
| 903,429 | 8/1962 | Great Britain. |

CHARLES B. PARKER, *Primary Examiner.*

R. L. RAYMOND, *Assistant Examiner.*